United States Patent

Beguin

[15] 3,701,160

[45] Oct. 24, 1972

[54] RADAR MONOPULSE ANTENNAS WITH CONVERTING POLARIZATION

[72] Inventor: Daniel Edmond Beguin, Saint-Prix, France

[73] Assignee: International Standard Corporation, New York, N.Y.

[22] Filed: June 23, 1971

[21] Appl. No.: 155,940

[30] Foreign Application Priority Data

June 25, 1970 France.......................7023592

[52] U.S. Cl. ..................343/755, 343/756, 343/786
[51] Int. Cl. .............................................H01q 19/00
[58] Field of Search......343/754, 755, 756, 786, 840, 343/909

[56] References Cited

UNITED STATES PATENTS 2,934,762  4/1960  Smedes.......................343/755

Primary Examiner—Eli Lieberman
Attorney—C. Cornell Remsen, Jr. et al.

[57] ABSTRACT

A monopulse antenna comprising an assymetrical parabolic reflector illuminated by a monopulse horn. A circular polarizing array cover adapted for selective emplacement over the horn aperture is provided. Changing from linear to circular polarization by placing the polarizer, by itself, over the horn produces an angular shift in antenna boresite (axis). A dielectric lens is provided for insertion over the polarizer to introduce a linear corrective phase shift, thereby eliminating the said axis shift.

8 Claims, 6 Drawing Figures

PATENTED OCT 24 1972 3,701,160

Inventor
Daniel E. Beguin

By William T. O'Neil
Agent

RADAR MONOPULSE ANTENNAS WITH CONVERTING POLARIZATION

CROSS-REFERENCE TO RELATED APPLICATIONS

The U.S. Pat. application for this case is filed with claim for priority pursuant to 35 U.S.C. 119, based on an application for the same invention filed in France on June 25, 1970, Ser. No. 7,023,592.

BACKGROUND OF THE INVENTION

1. Field of the Invention

The present invention relates generally to radar antenna systems, and more particularly, to monopulse (simultaneous lobing) antenna systems with linear/circular polarization selection.

2. Description of the Prior Art

At the outset, it will be recalled that a simultaneous lobing or monopulse radar makes it possible to measure magnitude and angle between the antenna axis (boresite) and a target. In an amplitude comparison monopulse radar, two primary sources are provided for each angular coordinate, these are simultaneously illuminating the same reflector. The two beams thus generated are physically located so that their radiation patterns are overlapping. The amplitudes of the received signals on both primary sources are respectively added in-phase and in phase opposition so that the sum signal S and difference signal D obtained are in phase for an error of one sense and out of phase for an error of the other sign. Such signals are respectively amplified in a sum reception channel and in a difference reception channel, the output signals of which are applied to a demodulator circuit. Such a demodulator circuit performs the operation $D/S$ and delivers a signal whose amplitude is substantially proportional, for small angles of deviation, to the magnitude of the deviation (angle error magnitude) and whose polarity depends on the error sign (sense with respect to the said axis).

The above-mentioned two primary sources are conveniently obtained through use of a rectangular cross-section horn comprising a median partition. The two horn outputs thus available are connected to a hybrid junction (magic-T, for example) which delivers signals respectively equal to the sum and to the difference of energies received by the two horn sections.

In radar techniques, it is known that for suppressing rain echoes, transmitting waves having circular polarization affords some significant discrimination against rain return. Such circular polarization waves are, for example, obtained through the use of a parallel metal plate device, called a polarizer, which, in the case of an antenna for a monopulse radar, is typically located in front of (over the opening of) the horn. The polarizer is located with its plane parallel to the plane of the horn opening and is oriented in such a manner that its plates make a 45° angle with respect to the linear polarization direction. The radiated field component which is perpendicular to the plates is unaffected by the polarizer, however, the component which is parallel to the said plates has its phase advanced by 90° and, consequently, the wave radiated from the polarizer is circularly polarized.

Since reflection coefficients of a statistical average rain drop are equal for the two circular polarization wave components, the wave reflected by a rain drop illuminated thereby is circularly polarized. When this reflected wave passes through the polarizer, the component which is parallel to the plates again experiences a phase advancement by 90°, with the result that, after having been combined with the other component, the resulting linear polarization is perpendicular to the initially transmitted wave polarization. As the horn constitutes a filter for waves having a polarization direction perpendicular to that for which it has been designed, waves reflected by rain drops results in a significant signal rejection at the polarizer. Rain echoes are thereby suppressed.

Other reflecting objects may present similar reflection coefficients thereby producing echo signals having rain-like polarization. Such signals would be similarly suppressed. Therefore, it is not desirable to continuously radiate in the circular polarization mode when no rain problem is extant. Accordingly, the polarizer is usually mounted on a mechanical device which makes it possible to emplace it on or remove it from the horn opening at will.

It will be noted that an operative polarizer may be located either at the horn output as hereabove, on the reflector itself, or behind the horn in the path of the waves reflected by the reflector. The most practical of these possibilities is generally considered to be the horn operative grating in that it is relatively compact compared to the other forms.

The parabolic reflector consists of a parabolic surface of revolution the focus of which coincides with the horn location. Due to the horn location, the horn acts as a mask producing "aperture blockage." In the prior art, one of the expedients for eliminating aperture blockage in this type of antenna system involves construction of the reflector as a partial surface of revolution with an offset feed oriented to illuminate this surface. Such a horn and reflector arrangement is depicted at FIG. 7.10 of the textbook, "Introduction to Radar Systems," by Merrill I. Skolnik, a McGraw-Hill book (1962). Such an arrangement with removable polarizer located between the horn and the reflector, when used for a monopulse radar, is subject to a shift of the antenna axis when changing from linear polarization to circular polarization. An angular error thus arises.

The manner in which the present invention eliminates this problem is hereinafter described.

SUMMARY OF THE INVENTION

An object of the present invention is to provide a device for use with a polarizer of the type aforementioned to shift the circular polarization beam axis in such a manner that it coincides with the linear polarization beam axis.

According to the invention, there is provided a monopulse radar antenna comprising an assymetrically shaped parabolic reflector, a primary source illuminating said reflector and providing a plane wave, a removable polarizer located between said primary source and said reflector, and means inserted between said polarizer and said reflector for introducing a phase shift varying linearly over the entire beam width from substantially zero to a predetermined value.

The above-mentioned and other features and objects of this invention will become apparent by reference to

DESCRIPTION OF THE PREFERRED EMBODIMENT

Figure 1:
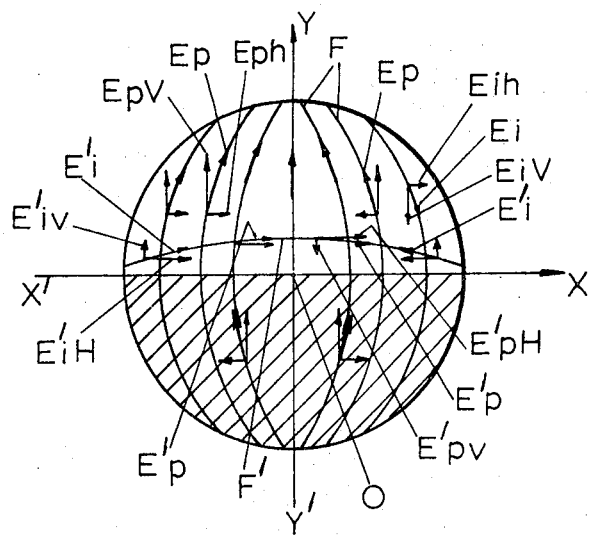
FIG. 1 shows several vector resolutions of the electric field at the reflector surface, for explanation of the background problem solved by the invention.
Figure 2:
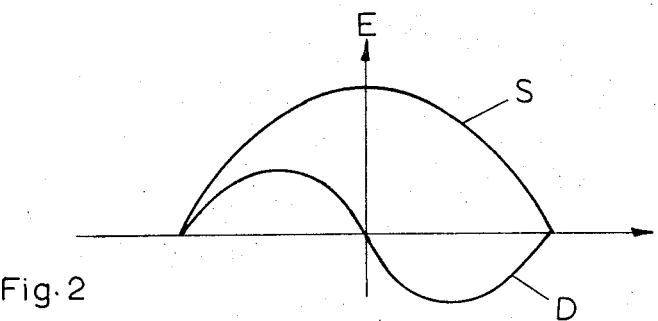
FIG. 2 shows two patterns of the electric field at the horn opening.

Before beginning the description of the present invention, an explanation in conjunction with the FIGS. 1, 2, 3(a), 3(b) and 3(c) will be given to provide an understanding of the reason why passing from linear polarization to circular polarization results in the antenna axis drift which is the problem to which the present invention is addressed.

in FIG. 1, the lines of force F of the electric field at the surface of a parabolic partial surface illuminated by a vertical polarization primary source are shown. A single line of force F', corresponding to horizontal polarization excitation is also drawn. The vectors of the electric fields E and E' as well as the vectors resulting from their resolution among the vertical axis Y'OY and the horizontal axis X'OX are shown in each of two cases, viz.; one (indicia p) when the primary source radiation pattern has an even symmetry, the other (indicia i) when the primary source radiation pattern has an odd symmetry. These symmetries correspond to sum and difference patterns, respectively, in monopulse operation. FIG. 2 illustrates these two electric field distributions in the horn aperture, the said even symmetry pattern being curve S and the odd symmetry pattern being curve D.

If the entire surface of revolution is illuminated, the vectorial resolution shows that there exists a spurious component, which is horizontal when polarization is vertical, and vertical when polarization is horizontal. The effects of that spurious component are compensated in the far electric field; however, such a compensation does not take place when only the upper half of the complete parabolic portion is employed (unhatched part, FIG. 1). That case corresponds to the aforementioned offset feed situation. Thus, in the case of the vertical polarization even symmetry primary radiation pattern, the horizontal components in the quadrants X'OY and XOY are mutually 180° out of phase and correspond to the odd symmetry radiation pattern as illustrated by the curve Sh of FIG. 3(a). The pattern generated by the main vertical component $E_pV$ is illustrated by the curve SV [FIG. 3(a)] whose amplitude is on the order of twenty decibels greater than that of the curve Sh.

If it is assumed that the phase of the pattern SV is zero, the phase of the spurious pattern Sh will be $-\pi/2$ at the left side (negative bearings) from the axis since it is necessary to turn by an angle $\pi/2$ in the direction opposite to the trigonometric direction (sign −) from the main vertical component $E_pV$ to the spurious horizontal component $E_ph$. Similar considerations for the spurious pattern Sh located in the positive bearing side shows that its phase is $\pi/2$.

Figure 3A:
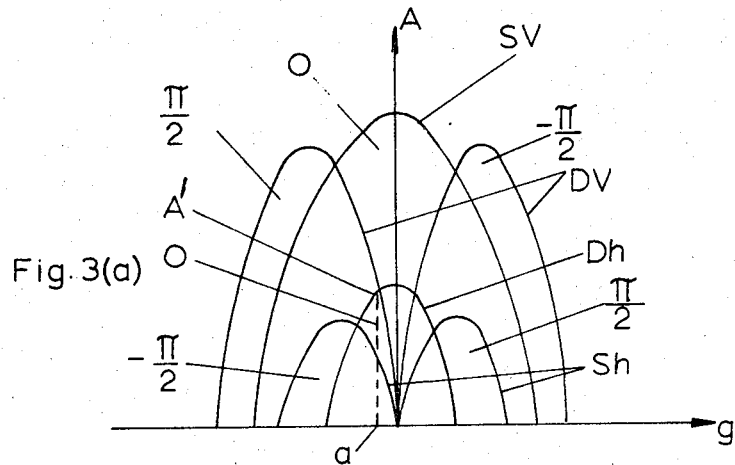
FIGS. 3(a), 3(b) and 3(c) illustrate radiation patterns which further describe the relationships producing antenna axis shift in circular polarization.

In the case of a vertical polarization, odd symmetry primary radiation pattern illuminating the upper half of the parabolic portion, the vectorial resolution shows that the main vertical component $E_iV$ has an odd pattern which corresponds to the radiation pattern DV of FIG. 3(a) while the spurious horizontal component Eih has an even symmetry which corresponds to the radiation pattern Dh of FIG. 3(a). The phase of the pattern Dh may be found according to the same previously mentioned considerations, i.e., a phase equal to zero is obtained.

As, on the one hand, the patterns SV and DV and, on the other hand, Sh and Dh have crossed polarization, these latter ones do not disturb the main patterns SV and DV.

Figure 3B:
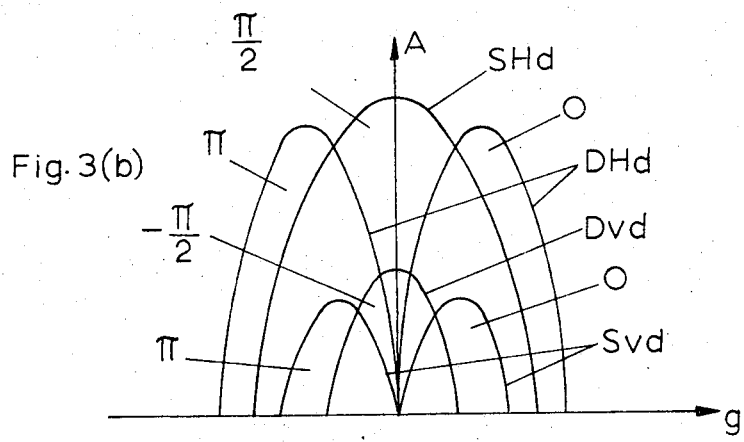

Similar consideration, as hereabove, given to the case of a horizontal polarization primary source, would show that the patterns resulting from the spurious vertical component [curves Svd and Dvd of FIG. 3(b)] do not disturb the horizontal polarization main patterns [curves SHd and DHd of the FIG. 3(b)]. In FIG. 1, the components to be considered are referenced E'p, E'pH, E'pv for the even symmetry pattern, and E'iH, E'iv for the odd symmetry pattern.

The conditions described described for linear polarization no longer hold true if the primary source radiates circular polarization waves, the representative vector of which may be reduced to vertical and horizontal orthogonal components. As a matter of fact, the circular polarization case amounts to coexistence of the radiation patterns of the FIGS. 3(a) and 3(b), the amplitudes in the same polarization plane in the same channel being added or subtracted depending on their relative phases.

By way of further example, in the FIG. 3(a), the relative phase of each pattern has been shown. Assuming that the radiated wave has a right circular polarization, the horizontal component is in advance by 90° (sign +) with respect to the vertical component and the relative phases of the patterns SHd and DHd resulting from the main horizontal components are as shown in FIG. 3(b). By examination of the components E' of the FIG. 1, the phases of the spurious patterns Dvd and Svd may be found in vertical polarization. The combination of the patterns DV and Dvd of the difference channel in vertical polarization shows that amplitudes are added for positive bearings and subtracted for negative bearings in such a manner that the null axis is shifted toward the negative bearings. The significance of that fact is that the null value of the ration D/S is no longer obtained for $g = 0$, but for a negative value of g defined by the bearing a of the point A'. In a same manner, the combination of the patterns DHd and DH in horizontal polarization shows that the null axis is also shifted toward the negative bearings by the same angle a.

The combination of the patterns in the sum channel, SV and Svd, for example, on the one hand, and SHd and Sh on the other hand, shows that the resulting patterns are dissymmetric, but such a dissymmetry has very little affect on the ratio D/S for low bearings values.

Figure 3C:
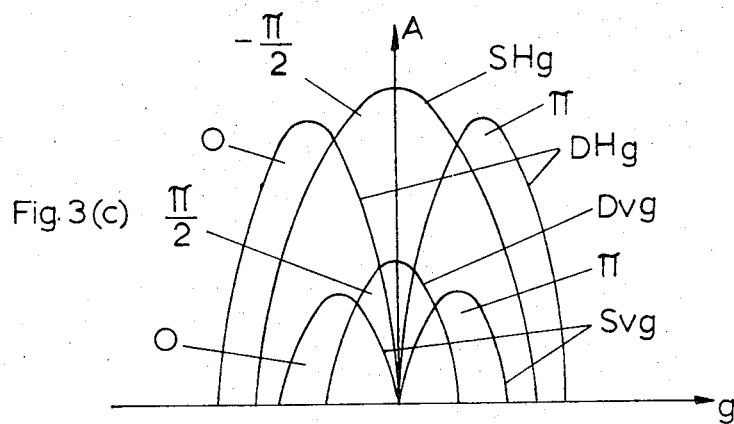

FIG. 3(c) shows the radiation patterns resulting from the horizontal component in the case of left circular polarization, which corresponds to a phase delay of 90° (sign −) of the said horizontal component with respect to the vertical component. The combination of the patterns $DV$ and $Dvg$ shows that amplitudes are subtracted for negative bearings in such a manner that the minimum (null) axis is shifted toward the positive bearings, that is to say in the reverse direction when compared with the case of right circular polarization.

As has been previously mentioned, the angular value of the shift is given by the bearing $a$ of the point $A'$. It can also be determined by calculation, which results in the following approximate formula:

$$a = -kd/\pi L \cong -kd/2\pi fb,$$

where $d$ is the system wavelength, $f$ the focal distance of the reflector, $2b$ the angle deviation between maxima of the two primary lobes of the difference channel and $k$ is the ratio of amplitudes of main and spurious vertical components. Quantities $a$ and $b$ will be expressed in radians. The above relationship has been established by assuming that the odd symmetry radiation pattern associated with the main components are provided by two punctual (point) sources $S-$ and $S+$ (FIG. 4) opposite in phase and spaced by a distance $L$. Those patterns are of the type $$\sin\left(\frac{\pi L}{d} \sin g\right),$$

the corresponding spurious patterns are of even symmetry and are represented by $$k \cos\left(\frac{\pi L}{d} \sin g\right).$$

The value of the angle $a$ is then determined from the equation:

$$\sin\left(\frac{\pi L}{d} \sin a\right) + k \cos\left(\frac{\pi L}{d} \sin a\right) = 0.$$

Figure 4:
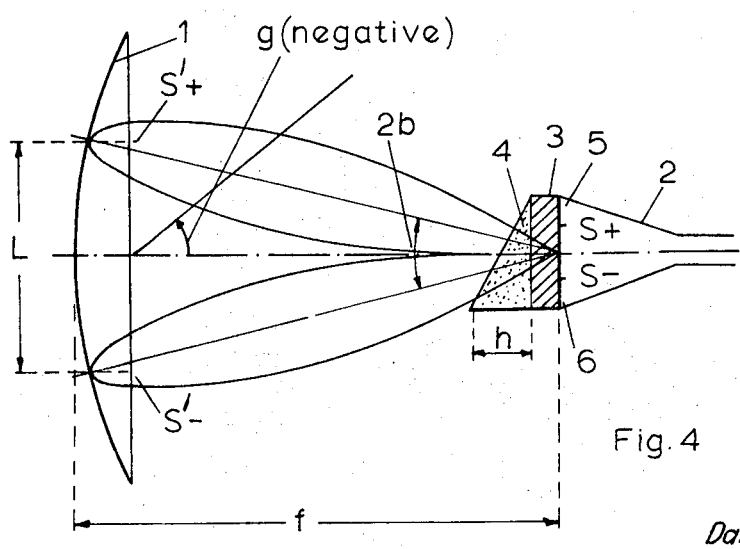
FIG. 4 shows a cross-section of an antenna according to the present invention.

The objective of the present invention being the elimination of the antenna axis shift upon polarization mode change, the present invention uniquely provides for the insertion of a removable dielectric phase correction lens over the polarization grid, between the polarizer and the reflector, the said dielectric lens being integral with the polarizer. FIG. 4 shows a cross-section, in a horizontal plane, of an assembly of reflector 1, horn 2, polarizer 3 and dielectric lens 4.

Since the electric field pattern for the horn aperture in the difference channel is that illustrated by the curve $D$ of FIG. 2, it may be considered, for the sake of simplicity, that the obtained primary radiation pattern is equivalent to that which would be obtained from two punctual sources $s-$ and $s+$ opposite in phase and each located at equal distance from the horn center and from the nearest side-wall. For the secondary pattern, the corresponding punctual sources are referenced $S'-$ and $S'+$, spaced by a distance $L$. These points $S'-$ and $S'+$ result from a geometric construction taking into account that the angle between the maxima of the two primary lobes is equal to $2b$.

It has been previously shown that changing from linear polarization to circulate polarization resulted in shifting the antenna axis by an angle $a$ toward the negative bearings, which means, according to antenna theory, that the phase difference between the sources $S'+$ and $S'-$ is no longer equal to $\pi$. It may be shown that the far electric field of an antenna comprising the punctual sources $S'-$ and $S'+$ is of the type:

$$1 + ej\left(c + \frac{2\pi L}{d} \sin g\right),$$

$j$ being the complex term such that $j^2 = -1$, $c$ being the phase shift between the source $S'+$ and the source $S'-$, and $g$ being the bearing which can be positive or negative.

If the polarizer is removed, the antenna axis corresponds to $g = 0$, the phase shift between $S+$ and $S-$ being equal to $\pi$. With the polarizer in place, the axis is shifted by an angle $a$ toward the negative bearings, which means that in the last above formula, $c - (2\pi L/d) \sin a = \pi$, (sign − if the negative value of $a$ is taken into account). Stated otherwise, the phase shift $c$ is greater than $\pi$. To correct the antenna axis, it is necessary that the phase shift be equal to $\pi$, a condition obtained by introducing a phase shift $(2\pi L/d) \sin a$ from the source $S'+$ to the source $S'-$, i.e., an additional phase shift $(2\pi L/d) \sin a$ from the source $S-$ to the source $S+$ or in an equivalent manner from the source $s-$ to the source $s+$ (at the horn aperture).

Indeed the sources $s+$ and $s-$ as well as $S'+$ and $S'-$ are fictive, and it is, therefore, not possible to physically modify their relative phase shift. The entire problem may be regarded from the point of view of a plane wave obtained at the polarizer output. To cause the beam or wave plane to rotate by an angle $a$, it is necessary to introduce a linear phase shift over the whole pattern output, the said phase shift varying substantially from the value zero at the end 5 of the polarizer to the value satisfying the relationship:

$$(4\pi L/d) \sin a = (16\pi f/d) \sin a \tan (b/2) \cong (8\pi fb/d) \sin a,$$

at the lateral extremity 6 of the said polarizer. Thus the required phase shift between the sources $s-$ and $s+$ is obtained. As shown by the FIG. 4, a prism 4 of dielectric material with a dielectric constant $B$ which has a base $h$ such that $(4\pi L/d) \sin a = (2\pi h/d) (\sqrt{B} - 1)$ may be used, or $h \cong 2L/\sqrt{B} - 1) a$, for low values of the angle $a$.

In order that the prism does not introduce significant discontinuities, the dielectric constant $B$ must be selected in the vicinity of unity. Good results have been obtained with a prism made of polyurethane foam having a dielectric constant $B = 1.10$.

In the case of left circular polarization [FIG. 3(c)], the antenna axis is shifted toward the positive bearings by an angle $a$, and it is necessary to reverse the prism position with the prism top or ridge close to the polarizer end 6 while the prism base $h$ would then be adjacent the end 5.

While the present invention has been described in connection with a specific apparatus, it is to be clearly understood that it is not limited to the said example. The drawings and this description are to be regarded as typical and illustrative only.

What is claimed is:

1. In a radar antenna system which includes a generally parabolic reflector illuminated by an offset primary source to provide a plane wave, the combination comprising:
   a polarizing device located between said primary source and said reflector;
   phase correction means inserted between said polarizer and said reflector for introducing a phase shift so as to produce a beam axis for said antenna system which is coincident with said beam axis in the absence of said polarizer.

2. A monopulse radar antenna system which includes an asymmetrically-shaped parabolic reflector and an offset monopulse feed horn for radiating and receiving a monopulse beam pattern, comprising the combination of:
   means comprising a polarizer over the aperture of said horn for circularly polarizing energy radiated from said horn and for responding to correspondingly polarized received energy;
   phase correction means comprising a dielectric lens employed over said polarizer in the field between said polarizer and said reflector, for introducing a phase shift to cause the axis of said monopulse beam pattern in circular polarization operation to coincide with the axis of the monopulse beam pattern produced in the absence of both said phase correction means and said polarizer.

3. Apparatus according to claim 2 in which said reflector extends in a first dimension symmetrically and in a second dimension unilaterally with respect to the axis of said horn, and said horn is oriented to illuminate substantially the entire surface of said reflector.

4. Apparatus according to claim 3 in which said horn is of rectangular cross-section with a median partition, thereby to provide two feed channels for monopulse implementation, and in which said lens comprises a tapered dielectric prism, said taper extending across the dimension of said horn normal to said median partition.

5. Apparatus according to claim 4 in which said taper produces a substantially linear prism thickness in the path of energy passing through said horn, said thickness varying from substantially zero adjacent one short side wall of said rectangular horn to a maximum adjacent the opposite short side wall of said horn.

6. Apparatus according to claim 5 in which said prism is constructed of dielectric material of approximately unity dielectric constant.

7. Apparatus according to claim 5 in which said prism is constructed of polyurethane foam having a dielectric constant approximately 1.10.

8. Apparatus according to claim 5 in which said prism thickness maximum is substantially equal to $2La/B - 1$, where L is the deviation on said reflector between the maxima of the two primary lobes of the difference channel of said monopulse radar antenna, a is the angular deviation between the antenna axis in linear and circular polarization.

* * * * *